United States Patent
Bolte et al.

(10) Patent No.: US 9,195,488 B2
(45) Date of Patent: Nov. 24, 2015

(54) IMAGE DEPLOYMENT IN A CLOUD ENVIRONMENT

(71) Applicant: International Business Machines Corporation, Armonk, NY (US)

(72) Inventors: Dirk Bolte, Boeblingen (DE); Herwig Elfering, Boeblingen (DE); Thomas Pohl, Boeblingen (DE); Martin Troester, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 229 days.

(21) Appl. No.: 13/661,314

(22) Filed: Oct. 26, 2012

(65) Prior Publication Data

US 2013/0132954 A1    May 23, 2013

(30) Foreign Application Priority Data

Nov. 21, 2011  (EP) ..................................... 11189898

(51) Int. Cl.
  *G06F 9/455* (2006.01)
  *G06F 9/445* (2006.01)
(52) U.S. Cl.
  CPC .............. *G06F 9/45533* (2013.01); *G06F 8/63* (2013.01); *G06F 9/45558* (2013.01); *G06F 2009/45562* (2013.01)
(58) Field of Classification Search
  None
  See application file for complete search history.

(56) References Cited

U.S. PATENT DOCUMENTS

| 6,915,307 | B1 | 7/2005 | Mattis et al. |
| 7,032,089 | B1 | 4/2006 | Ranade et al. |
| 7,809,888 | B1 | 10/2010 | Clark |
| 8,073,990 | B1 | 12/2011 | Baron et al. |
| 8,495,512 | B1* | 7/2013 | Lappas et al. ................ 715/764 |
| 2006/0136667 | A1 | 6/2006 | Shultz et al. |
| 2008/0201528 | A1 | 8/2008 | Hsu et al. |
| 2009/0070771 | A1* | 3/2009 | Yuyitung et al. ............ 718/105 |
| 2010/0070715 | A1 | 3/2010 | Waltermann et al. |
| 2011/0148895 | A1 | 6/2011 | Burckart et al. |
| 2011/0173370 | A1 | 7/2011 | Jacobs et al. |
| 2011/0173616 | A1* | 7/2011 | Lattmann et al. ................ 718/1 |
| 2011/0214122 | A1* | 9/2011 | Lublin et al. .................... 718/1 |
| 2012/0144389 | A1 | 6/2012 | Hicks et al. |

FOREIGN PATENT DOCUMENTS

WO    WO 2012/000879 A1    1/2012

OTHER PUBLICATIONS

Combined Search and Examination Report under Sections 17 and 18(3) dated Apr. 23, 2013, Application No. GB1220041.6, 5 pages.

(Continued)

*Primary Examiner* — Emerson Puente
*Assistant Examiner* — Zhi Chen
(74) *Attorney, Agent, or Firm* — Francis Lammes; Stephen J. Walder, Jr.; Parashos T. Kalaitzis (57) ABSTRACT

The invention relates to a mechanism for image deployment in a cloud environment comprising at least two hosts coupled to at least one disk, and at least one virtual machine created in at least one host of the at least two hosts by deploying an additional image to the at least one disk. The method is characterized in that the at least one host for deploying an additional image is selected according to a deployment factor representing a communality relationship between one or more existing base images in the cloud environment and the additional image.

20 Claims, 6 Drawing Sheets

$$\frac{\sum commonblocks_{baseimage1}}{\sum blocks_{baseimage1}} = communalityfraction_{baseimage1}$$

$$\frac{\sum commonblocks_{baseimage2}}{\sum blocks_{baseimage2}} = communalityfraction_{baseimage2}$$

$$\frac{\sum commonblocks_{baseimage1} + \sum commonblocks_{baseimage2}}{\sum blocks_{baseimage1} + \sum blocks_{baseimage2}} = communalityfraction_{baseimage1 \wedge baseimage2}$$

$$\sum commonblocks_{baseimage1} = \sum commonblocks_{baseimage2}$$

$$\rightarrow \frac{2 \times \sum commonblocks_{baseimage1}}{\sum blocks_{baseimage1} + \sum blocks_{baseimage2}} = communalityfraction_{baseimage1 \wedge baseimage2}$$

$$e.g. \frac{2 \times 2}{3+3} = \frac{2}{3}$$

(56) References Cited

OTHER PUBLICATIONS

"Fast Virtual Disk (FVD) for QEMU", IBM Corparation : http://researcher.watson.ibm.com/researcher/view_project.php?id=1852, Jan. 2011, 5 pages.

"Future Work", http://www.usenix.org/event/wiov08/tech/full_papers/liguori/liguori_html/node5.html, Retrieved from internet on Sep. 19, 2012, 2 pages.

Biswas, Susmit et al., "Multi-Execution: Multicore Caching for Data-Similar Executions", Proceedings of the 36th Annual International Symposium on Computer Architecture (ISCA'09), Austin, Texas, Jun. 20-24, 2009, 10 pages.

Gupta, Diwaker et al., "Difference Engine: Harnessing Memory Redundancy in Virtual Machines", 8th USENIX Symposium on Operating Systems Design and Implementation, San Diego, California, Dec. 8-10, 2008, pp. 309-322.

Koller, Ricardo et al., "I/O Deduplication: Utilizing Content Similarity to Improve I/O Performance", ACM Transactions on Storage (TOS), vol. 6, Issue 3, Sep. 2010, 14 pages.

Min, Jaehong et al., "Efficient Deduplication Techniques for Modern Backup Operation", IEEE Transactions on Computers, http://www.dmclab.hanyang.ac.kr/files/publication/journals/international/TC-2009-11-0573.R1_Won.pdf, vol. 60 Issue 6, Issue Date: Jun. 2011, pp. 824-840.

U.S. Appl. No. 13/664,072.

Response to Examination Report under Section 18(3) filed Oct. 1, 2013, Application No. GB1220041.6, 7 pages.

U.S. Appl. No. 14/304,203.

Combined Search and Examination Report under Sections 17 and 18(3), GB Application No. GB1219733.1, dated Mar. 20, 2013, 4 pages.

U.S. Appl. No. 13/766,229.

Knot, Tushar et al., "Adaptive Filetype Aware Prefetching", Department of Computer Sciences, University of Wisconsin, Madison, Aug. 21, 2010, pp. 1-12.

\* cited by examiner

Fig. 1

Base image 1

| Keep: true | Keep: false | Keep: false | Keep: true |
|---|---|---|---|
| Data: AA | Data: BA | Data: BA | Data: CA |

26a ⟶ 58

Base image 2

| Keep: true | Keep: false | Keep: false | Keep: true |
|---|---|---|---|
| Data: AA | Data: BA | Data: BA | Data: DA |

26b $$\frac{\sum commonblocks_{baseimage1}}{\sum blocks_{baseimage1}} = communalityfraction_{baseimage1}$$

$$\frac{\sum commonblocks_{baseimage2}}{\sum blocks_{baseimage2}} = communalityfraction_{baseimage2}$$

$$\frac{\sum commonblocks_{baseimage1} + \sum commonblocks_{baseimage2}}{\sum blocks_{baseimage1} + \sum blocks_{baseimage2}} = communalityfraction_{baseimage1 \wedge baseimage2}$$

$$\frac{2 \times \sum commonblocks_{baseimage1}}{\sum blocks_{baseimage1} + \sum blocks_{baseimage2}} = communalityfraction_{baseimage1 \wedge baseimage2}$$

$$e.g. \quad \frac{2 \times 2}{3 + 3} = \frac{2}{3}$$

Fig. 2

Base image 1

| Count: 10 | Keep: false | Keep: false | Count: 20 | Count: 40 |
|---|---|---|---|---|
| Keep: true | | | Keep: true | Keep: true |
| Data: AA | | | Data: BA | Data: CA |

Base image 2

| Count: 12 | Keep: false | Count: 18 | Keep: false | Count: 33 |
|---|---|---|---|---|
| Keep: true | | Keep: true | | Keep: true |
| Data: AA | | Data: BA | | Data: DA |

$$\frac{\sum blockcount_{commonblocks\ baseimage1}}{\sum blockcount_{blocks\ baseimage1}} = weightedcommunalityfraction_{baseimage1}$$

$$\frac{\sum blockcount_{commonblocks\ baseimage2}}{\sum blockcount_{blocks\ baseimage2}} = weightedcommunalityfraction_{baseimage2}$$

$$\frac{\sum blockcount_{commonblocks\ baseimage1} + \sum blockcount_{commonblocks\ baseimage2}}{\sum blockcount_{blocks\ baseimage1} + \sum blockcount_{blocks\ baseimage2}} =$$

$$= weightedcommunalityfraction_{baseimage1 \wedge baseimage2}$$

$$e.g.\ \frac{(10+20)+(12+18)}{(10+20+40)+(12+18+33)} = \frac{60}{133} \approx 0{,}45$$

|  | base image 1 | base image 2 | base image 3 | base image 4 |
|---|---|---|---|---|
| base image 1 | 1 | 0.6 | 0.57 | 0.44 |
| base image 2 | 0.6 | 1 | 0.8 | 0.78 |
| base image 3 | 0.57 | 0.8 | 1 | 0.92 |
| base image 4 | 0.44 | 0.78 | 0.92 | 1 |

40

$$normalized\ communality\ value : \frac{\sum_{n=image\ first}^{image\ last} communality_{baseimage_{current}}\ ^{\wedge} baseimage_n}{\sum images}$$

T3

| | image 1 | image 2 | image 3 | image 4 | image 5 | image 6 | Calculate "best match": Normalized communality value for base image 1 |
|---|---|---|---|---|---|---|---|
| host1 | base image 1 | base image 3 | base image 2 | base image 1 | | | $(1+0.57+0.6+1)/4 = 0.7925$ |
| host2 | base image 2 | base image 2 | base image 2 | base image 2 | base image 4 | base image 4 | $(0.6+0.6+0.6+0.6+0.44+0.44)/6 = 0.5467$ |
| host3 | base image 2 | base image 4 | base image 4 | base image 3 | base image 3 | | $(0.6+0.44+0.44+0.57+0.57)/5 = 0.5240$ |

IMAGE DEPLOYMENT IN A CLOUD ENVIRONMENT

BACKGROUND

The invention relates to a method and a system for image deployment in a cloud environment comprising at least two hosts, particularly for the selection of hosts for the image deployment during creation of new virtual machines.

During the creation of a virtual machine (VM) on a host within a cloud environment, there is usually the challenge to deploy the corresponding image file in a very fast way.

Virtual machines are also known as virtual hosts or servers. Hosts are computer systems comprising at least one CPU; they may comprise a local disk too, but this is not mandatory. They may be connected to a network system where they can use a shared file system on at least one network disk via an IO infrastructure.

Typical cloud offerings provide a set of predefined configurations. These configurations are associated with a certain file image of a virtual disk. Creating such an image based on a predefined installation either requires a complete installation procedure to run or to copy and to customize an existing image.

Another approach to achieve this is to use the so-called snapshot or backing-file feature available for some image file formats: A common base image is used read-only (RO). A new image is created which references the base image. Every write operation is now done to the new image while the base image remains unchanged. This approach reduces the creation time from 10 minutes down to a few seconds. Another benefit of this approach is the reduced disk and cache usage as many operations on the base image are done on the very same file.

To allow failovers and independence of images from their host, shared file systems are usually used in multi-server environments. Such a system does not scale very well, if e.g. a single host can run ten virtual machines in parallel, already ten hosts of such a configuration result in hundred virtual machines accessing the same shared file system at the very same time. The access pattern of hundred virtual machines running in parallel is equivalent to random access, causing regular non-flash-disks to search back and forward all the time.

Therefore the configuration has to reduce the IO operations as much as possible to prevent disk accesses where possible. Although flash devices do not face the search time impact conventional hard disks see, it is still desired to prevent disk accesses where possible, e.g. to extend flash chip lifetimes. An easy solution to this problem is to use large caches and to consolidate write operations.

The heuristic an operating system (OS) is using which data to keep in cache is dependent on many factors. Nevertheless a misuse of a virtual machine resulting in heavy input/output (IO) operations might break the environment as caches might be used for other tasks.

For an environment with one or several base images it is desirable to keep as much data in cache as possible or even to customize which data to keep in cache.

When running in an environment where several images are provided to a customer another issue arises. Although all images are quite similar and only vary in a small subset of files within the disk image, the images are still seen by the server OS as distinct files.

State of the art approaches to minimize data duplication in memory utilizing hashes do not scale very well and only work on small memory sizes as the search overhead grows massively with the cache size. Providing cache sizes of several Gigabytes render these approaches useless.

Several state of the art mechanisms exist for limiting the amount of data in a cache in general, as well as for finding and removing duplications in particular. The solutions known in the prior art either use caches with a heuristic which cannot be configured or just copy every data block/file which is accessed.

U.S. 2011/0148895 A1 describes how to start the image and clones snapshots which have a pre-filled cache. This approach reduces the cache pages to be stored. U.S. 2011/0148895 A1 discloses caching by determining data blocks to be cached based on the validity and performance of a cache entry. A cache image including only cache entries with valid durations of at least a configured deployment date for a virtual machine image is prepared via an application server for the virtual machine image. The virtual machine image is deployed to at least one other application server as a virtual machine with the cache image including only the cache entries with the valid durations of at least the configured deployment date for the virtual machine image.

Deciding about how and where to deploy a VM in a cloud environment can be done based on various factors. Usually, host capacity and capabilities as well as VM requirements are taken into account. With a high number of VMs running on the same host, IO performance should be taken into account as well as it becomes a more and more limiting factor.

Having an environment with several VMs running on the same host in parallel, single read/write operations result in a random access pattern on the disk subsystem of the virtualization host. Depending on the load of each VM, this might cause severe impact on the IO performance of all VMs accessing the same disks. Especially when massive write operations flush the underlying caches, every read operation required to guarantee a normal level of operation within a VM is blocked, thus having massive impact for the user of the VMs. In large configurations where a storage area network (SAN) infrastructure is used to allow easy and fast deployment of VMs on all attached hosts, the severity of the impact of such a behavior is even higher as it affects VMs running on all attached hosts.

SUMMARY

It is an object of the invention to provide a method for image deployment in a cloud environment comprising at least two hosts, particularly for the selection of hosts for the image deployment during creation of new virtual machines.

Another object is to provide a system for image deployment in a cloud environment comprising at least two hosts.

The objects are achieved by the features of the independent claims. The other claims, the description and the drawings disclose advantageous embodiments of the invention.

In one illustrative embodiment, a method for image deployment in a cloud environment is proposed comprising at least two hosts coupled to at least one disk and at least one virtual machine created in at least one host of the at least two hosts by deploying an additional image to the at least one disk. The at least one host for deploying the additional image is selected according to a deployment factor representing a communality relationship between one or more existing base images in the cloud environment and the additional image.

The described method and system for image deployment in a cloud environment may be realized in a network system connected to or comprising a local area network (LAN) as well as may be realized in a storage area network (SAN) system.

The inventive method is based on communality relationships between similar images potentially having identical data blocks. A data block is to be understood as the minimum unit for read/write-access on a hard disk, for instance in quantities of 512 bytes. Hard disks are usually divided in logical data blocks. Data blocks are uniquely addressable units on hard disks.

A virtual machine (VM) is a completely isolated guest operating system (G_OS) installation within a normal host operating system, being a software implementation of a machine, i.e. a computer, which executes programs like a physical machine. Modern virtual machines are implemented with either software emulation or hardware virtualization or, in most cases, both together. Virtual machines are separated into two major categories, based on their use and degree of correspondence to any real machine. A system virtual machine provides a complete system platform which supports the execution of a complete operating system (OS). In contradistinction to this, a process virtual machine is designed to run a single program, which means that it supports a single process. An essential characteristic of a virtual machine is that the software running inside is limited to the resources and abstractions provided by the virtual machine.

In computing, a virtual machine manager (VMM), also called hypervisor, is one of many hardware virtualization techniques that allow multiple operating systems, termed guests, to run concurrently on a host computer. It is named like that because it is conceptually one level higher than a supervisory program. The VMM presents to the guest operating systems a virtual operating platform and manages the execution of the guest operating systems. Multiple instances of a variety of operating systems may share the virtualized hardware resources. Hypervisors are installed on host hardware whose only task is to run guest operating systems. Non-hypervisor virtualization systems are used for similar tasks on dedicated host hardware, but also commonly on desktop, portable and even handheld computers. The VMM provides the means for simultaneous use of cloud facilities. VMM is a program on a host system that lets one computer support multiple execution environments, which can be identical or similar or have different hardware configurations. From a user's point of view, the system is a self-contained computer which is isolated from other users. In reality, every user is being served by the same machine. A virtual machine is one operating system (OS) that is being managed by an underlying control program allowing it to appear to be multiple operating systems. In cloud computing, VMM allows users to monitor and thus manage aspects of the process such as data access, data storage, encryption, addressing, topology, and workload movement.

Favorably, several mechanisms for de-duplication or merging of data blocks in cache as one possibility for optimizing the performance of a cloud environment system may be used, which means that identical data blocks, even if they are located on different file positions, are only stored once in memory. Especially for cloud environments data blocks may be consolidated although they reside in different files, the positive effect of using the same base image for VMs running on the same host can be extended to other scenarios, so as to slightly different read-only base images, e.g. for different software installations. VMs may be cloned and therefore start with the same content but change over time.

The effectiveness of de-duplication mechanisms depends on the similarity between VM images deployed on one host. A deployment process that intentionally increases image similarity of images executed on the same host is described. A deployment factor may be calculated based on the image communality and this factor may be used for determining which host to deploy a new VM to.

One advantage of including this deployment factor is that similar images are preferentially stored on the same hosts, thereby massively reducing the amount of IO operations for basic tasks. Especially when using a shared file system, this has a positive effect on the overall performance of the cloud. Nevertheless the effects are also positive when running with a local hard disk. As the IO performance improves, the user can work more fluently with the environment. Especially for standard tasks like booting, browsing and starting pre-installed software, the responsiveness of the system will improve, resulting in a higher customer satisfaction.

In another illustrative embodiment, a computer program product comprising a computer readable storage medium is proposed. The computer readable program, when executed on a computing device, causes the computer to perform various ones of, and combinations of, the operations outlined above with regard to the method illustrative embodiment.

In yet another illustrative embodiment, a data processing system is provided. The data processing system may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The present invention together with the above-mentioned and other objects and advantages may best be understood from the following detailed description of the embodiments, but not restricted to the embodiments, wherein is shown in.

DETAILED DESCRIPTION

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

Figure 1:
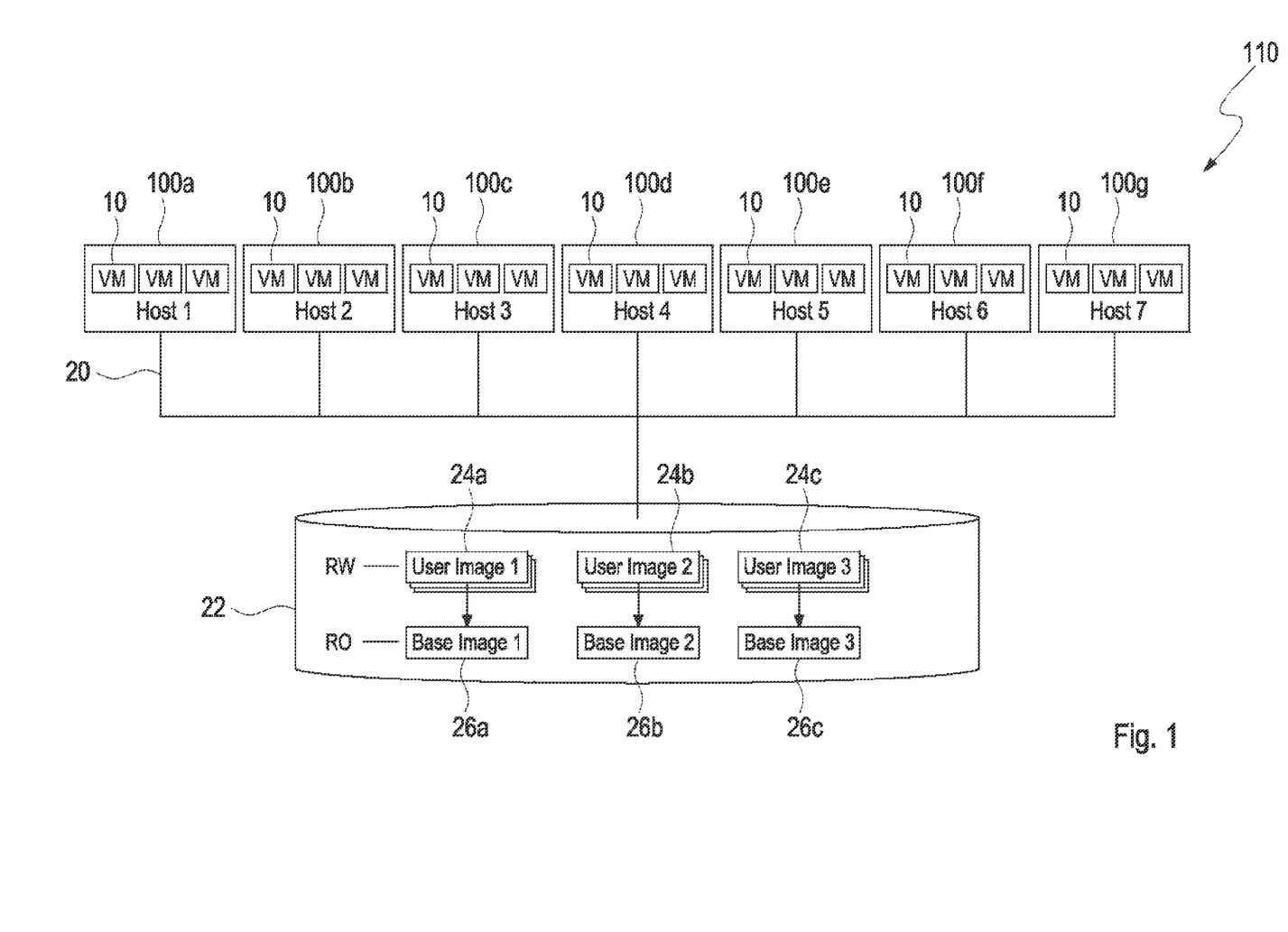
FIG. 1 is an example of a cloud environment, comprising a variety of hosts coupled to a disk system, with several virtual machines running on each host, the corresponding user images and the respective base images residing on the disk according to the prior art.

In FIG. 1 an example of a cloud environment 110 comprising several virtual machines 10 running on the same host for a variety of hosts 100a . . . 100g is shown, all connected to a common disk system 22 via an input/output (IO) system 20. The disk system 22, e.g., comprises a shared file system of the cloud environment 110. Also shown in the FIG. 1 is the separation between read-only (RO) base images 26a . . . 26c (also denoted as base image 1, base image 2 and base image 3 in the Figure) and a variety of read-write (RW) user images 24a . . . 24c. The base images 26a . . . 26c may be similar, but not identical, so e.g. for different flavors of the same operating system (OS) the base OS may be the same, but additional packages of the OS may differ. For the case of SW development there may be high communality with the previous image but not with the base image.

According to the inventive method for image deployment in the cloud environment 110 at least one additional virtual machine 10 is created by deploying at least one additional image to the file system of the disk 22. The host 100a-100g for deploying this additional image is selected according to a deployment factor, representing a communality relationship between one or more existing base images 26a-26c in the cloud environment 110 and the additional image.

The performance of the cloud environment 110 is greatly improved by using profiling and cache consolidation, when placing similar images on the same host as the used mechanisms result in a reduced IO load. By using an indication on how similar images are and adjust this with profiling data for each cacheable data block of file content, the host best suitable may be found from an IO caching point of view. The effect of IO caching is very high. As the same executables, files and directories have to be accessed when booting, browsing the file system or starting a pre-installed software, every image data block which is already stored in memory has a positive affect. With a read-only base image approach, only a small subset of files changes over the runtime of an image. So a high benefit from caching common data results.

For determining the deployment factor the communality relationship of two images in fraction of all data blocks in both images may be determined Calculation of this communality value can benefit from underlying techniques that will realize cache merging on the host, i.e. making the decision if data blocks are identical and therefore may be stored only once in the memory. Ideally, the communality value is adapted to the underlying technique. For calculation purposes, the resulting factor should represent a numerical value between 0 (=no common data blocks) and 1 (=all data blocks are common). This value describes the benefit that can be gained by the merging method when running these two images on the same host.

Figure 2:
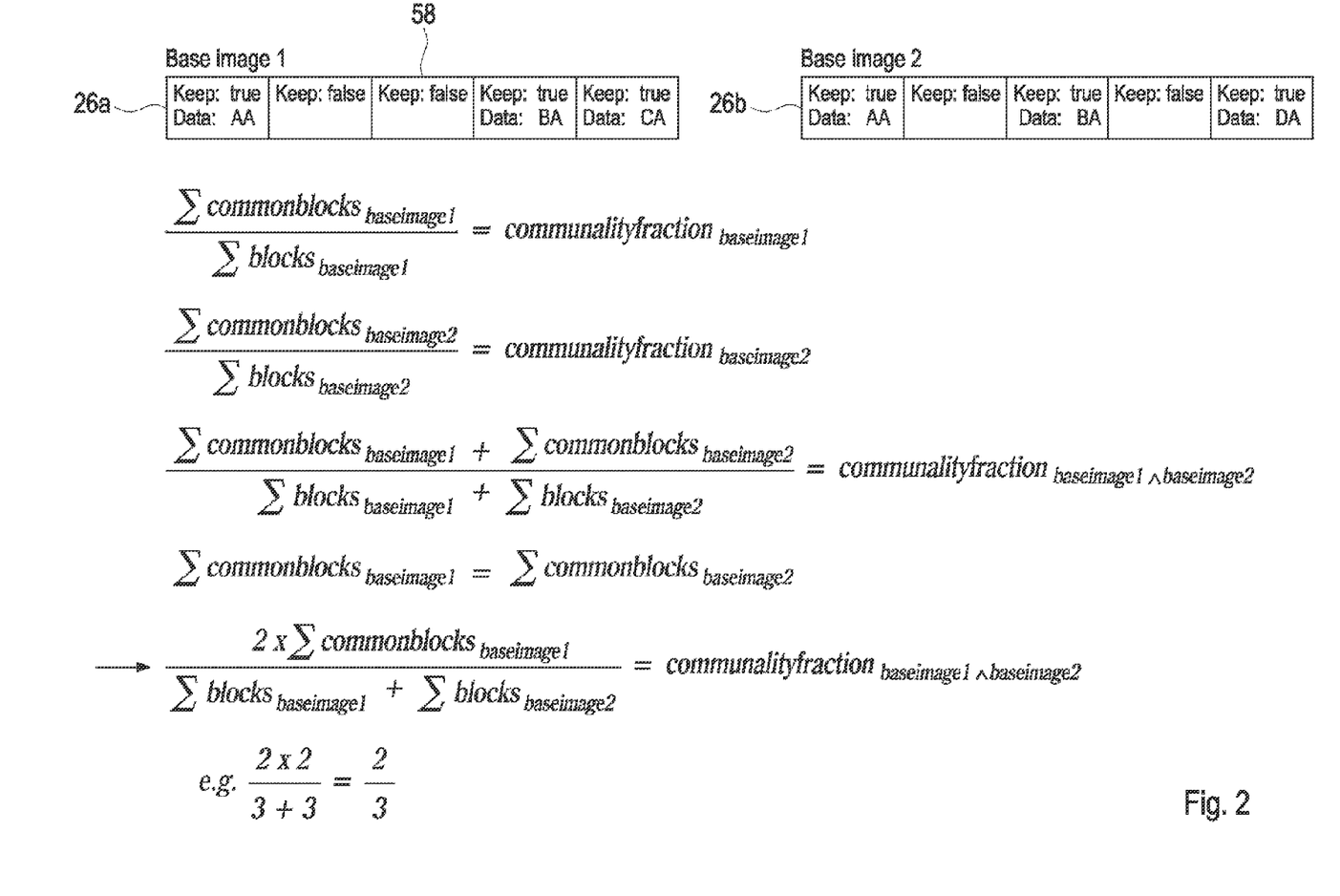
FIG. 2 depicts a concept of a single layer communality value calculation for two base images.

FIG. 2 shows an example for the determination of a communality value for two base images 26a and 26b on the basis of comparing the data content for all cacheable data blocks 58 of the base images 26a and 26b. It can be seen that for the example shown two cacheable data blocks are identical concerning the content of the cacheable data blocks for the two base images 26a and 26b.

Applying the following formulas (which are also depicted in FIG. 2) for calculating the communality values, a communality value of 0.66 for the two base images 26a and 26b is calculated, as shown in the Figure.

A first communality value, in the formula referred to as communalityfractionbaseimage1, is calculated for base image 26a (referred to as base image1 in the formula) by summing the data blocks in base image 1 which have identical content divided by the sum of all data blocks of base image 1:

$$\frac{\sum commonblocks_{baseimage1}}{\sum blocks_{baseimage1}} = communalityfraction_{baseimage1}$$

A second communality value, in the formula referred to as communalityfraction$_{baseimage2}$, is calculated for base image 26b (referred to as base image2 in the formula) by summing the data blocks in base image 2 which have identical content divided by the sum of all data blocks of base image 2:

$$\frac{\sum commonblocks_{baseimage2}}{\sum blocks_{baseimage2}} = communalityfraction_{baseimage2}$$

A communality value as a result for the communality relationship of base images 1 and 2, in the formula referred to as communalityfraction$_{baseimage1 \wedge baseimage2}$, which represents the normalized value of the total sum of the common data blocks in the base image 1 and base image 2 is calculated $$\frac{\sum commonblocks_{baseimage1} + \sum commonblocks_{baseimage2}}{\sum blocks_{baseimage1} + \sum blocks_{baseimage2}} =$$

$$communalityfraction_{baseimage1 \wedge baseimage2}$$

When the sums of the common data blocks of base images 1 (base image 26a) and base image 2 (base image 26b) are equal $$\Sigma commonblocks_{baseimage1} = \Sigma commonblocks_{baseimage2}$$

this results in a communality value communalityfraction$_{baseimage1 \wedge basemage2}$, of $$\rightarrow \frac{2 \times \sum commonblocks_{baseimage1}}{\sum blocks_{baseimage1} + \sum blocks_{baseimage2}} =$$

$$communalityfraction_{baseimage1 \wedge baseimage2}$$

Applying the values shown in the Figure, the result for the communality value is $$e.g. \frac{2 \times 2}{3 + 3} = \frac{2}{3}$$

Figure 3:
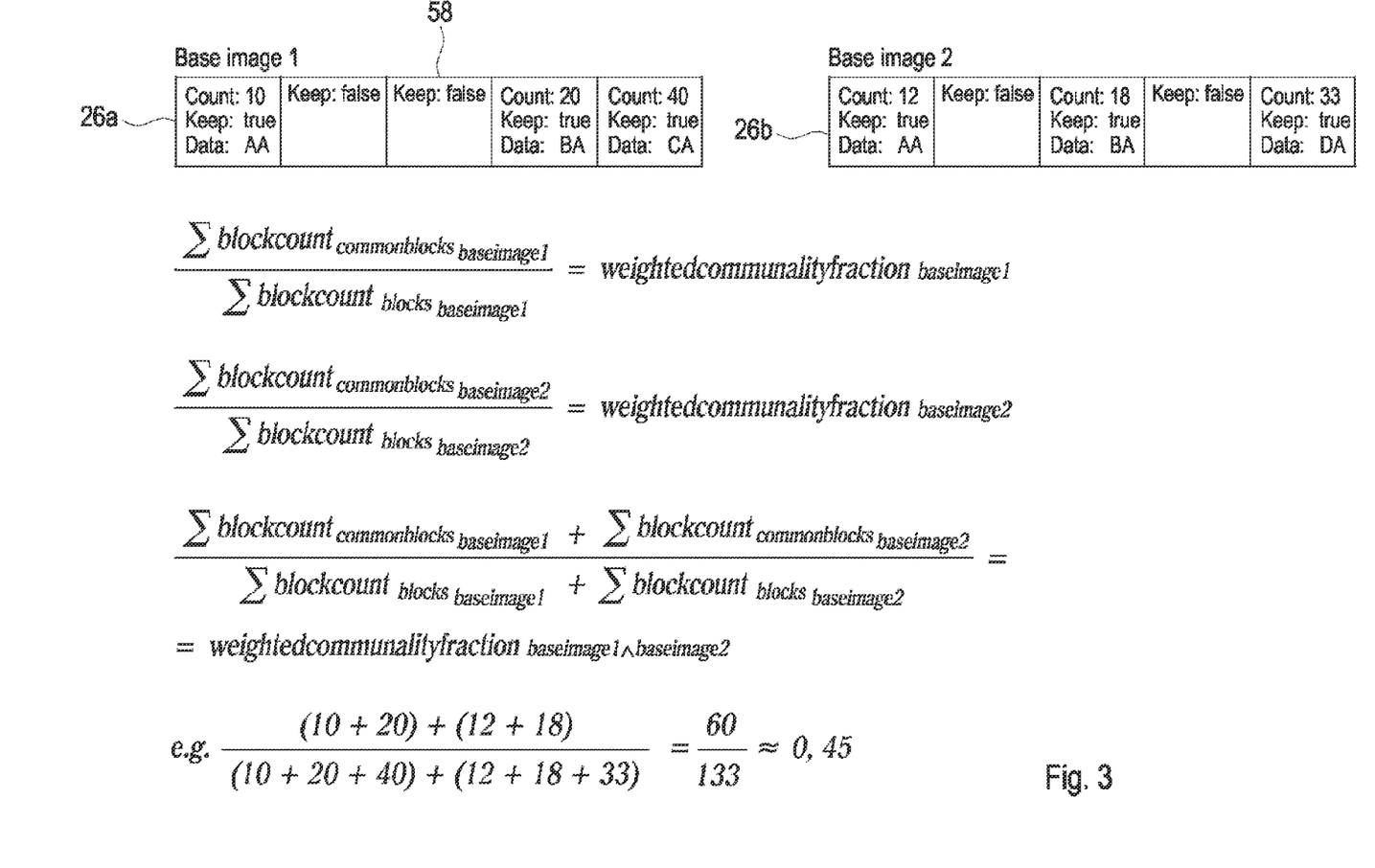
FIG. 3 depicts a concept of a single layer communality value calculation for two base images, considering data block weights as a profiling information.

In FIG. 3 the example of FIG. 2 is extended using additional profiling information for the comparison of the individual data blocks 58 of the different base images 26a and 26b. For the example shown the data block access rate is used for weighting the data blocks 58 for determining appropriate communality values. A simple profiling, namely just counting read access to a data block allows to add this as a weight. In this case, the implementation has to take care that the weight of data blocks is normalized for a whole image to reduce negative impacts caused by different durations of profiling runs, which generated the weights of data blocks. FIG.

3 shows a calculation when using read access counter as weight. Instead of creating a sum of kept data blocks, a sum of data block weights is calculated and normalized using the weight of all data blocks in the image. As can be seen, in the example shown, in base image 26a (referred to as base image 1 in the formula) data block 1 has an access count of 10, data block 4 of 20, data block 5 of 40, whereas in base image 26b (referred to as base image 2 in the formula) data block 1 has an access count of 12, data block 3 of 18, data block 5 of 33. These data blocks have the same respective content between the two base images 1 and 2, although their positions in the base image 1 or 2 may not necessarily be the same.

Using the following formulas (also depicted in FIG. 3) for determining the corresponding communality value now delivers a numerical value of 0.45 for the two base images 1 and 2 of the example depicted.

A weighted communality value, referred to as weightedcommunalityfractionbaseimage1, is calculated by summing the data block access rates of common data blocks of base image 1 and dividing the sum by the sum of the data block access rates of all data blocks of base image 1 to be kept.

$$\frac{\sum blockcount_{commonblocks_{baseimage1}}}{\sum blockcount_{blocks_{baseimage1}}} =$$

$$weightedcommunalityfraction_{baseimage1}$$

A weighted communality value, referred to as weightedcommunalityfraction$_{baseimage2}$, is calculated by summing the data block access rates of common data blocks of base image 2 and dividing the sum by the sum of the data block access rates of all data blocks of base image 2 to be kept.

$$\frac{\sum blockcount_{commonblocks_{baseimage2}}}{\sum blockcount_{blocks_{baseimage2}}} =$$

$$weightedcommunalityfraction_{baseimage2}$$

A weighted communality value as a result for the communality relationship of base images 1 and 2, referred to as weightedcommunalityfraction$_{baseimage1 \wedge baseimage2}$, is calculated by summing the data block access rates of common data blocks of base images 1 and 2 and dividing the sum by the sum of the data block access rates of all data blocks of base images 1 and 2 to be kept.

$$\frac{\sum blockcount_{commonblocks_{baseimage1}} + \sum blockcount_{commonblocks_{baseimage2}}}{\sum blockcount_{blocks_{baseimage1}} + \sum blockcount_{blocks_{baseimage2}}} =$$

$$weightedcommunalityfraction_{baseimage1 \wedge baseimage2}$$

Applying the values shown in the Figure, the result for the weighted communality value is $$\text{e.g.} \frac{(10+20)+(12+18)}{(10+20+40)+(12+18+33)} = \frac{60}{133} \approx 0.45$$

Figure 4:
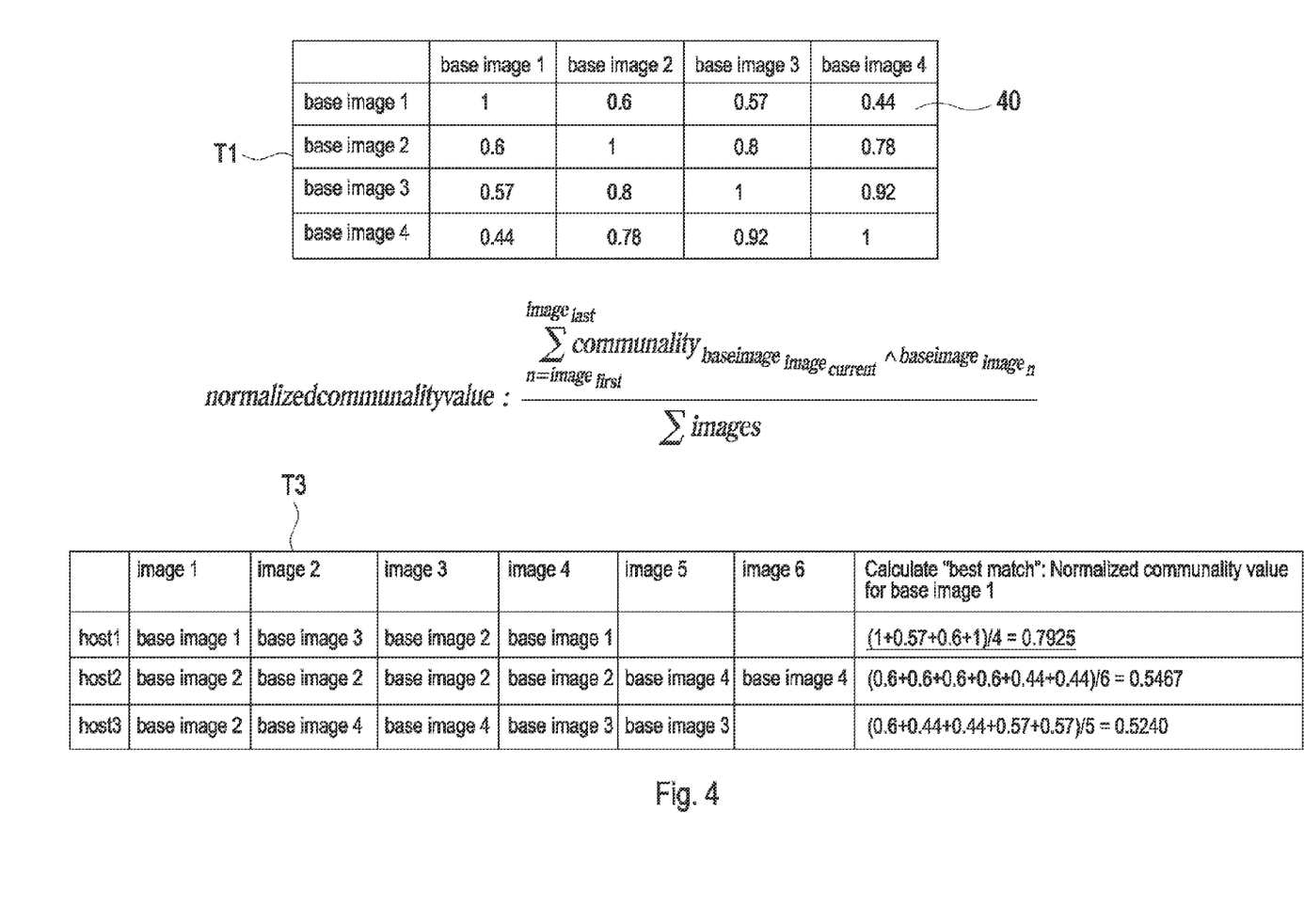
FIG. 4 depicts a concept of deriving a communality matrix for normalized communality values for pairs of base images as well as a communality matrix between base images and hosts resulting in a deployment factor.

FIG. 4 shows a concept of generating a communality matrix of normalized communality values for pairs of base images as well as a communality matrix between hosts and images, depending on various base images, delivering a deployment factor as a result for the decision on which host a new image may be deployed.

Independent from which mechanism for merging data blocks or which method is used for calculating data block communality values 40 the resulting deployment factor represents the communality of two images and therefore can be used for later calculation.

To find the best host for a VM deployment based on this deployment factor, a matrix may be created which shows the communality values 40 of each pair of base images. The table T1, shown in FIG. 4, is an example for a communality matrix of 4 base images.

On VM deployment, communality values 40 stored in the communality matrix T1 to find the best host are used. Therefore the new VM image or its base image is compared with the other images/base images on all hosts within the cloud environment.

The resulting communality values 40 may be normalized to be independent from the number of VMs running on a host. The communality values may also be used in any other algorithm for VM deployment.

For calculating the deployment factor, another matrix may be used, which shows which images depending on which base images are running on which host. In case base images are used, the base images for each VM can be retrieved based on this matrix or already be available in this matrix, because predefined communality values are used.

For each host, a normalized communality value may be calculated. Further, for each host, the communality value of the current image with any image running on that host may be summed up and divided by the number of VMs running on that host, as defined by following formula (also shown in the Figure).

$$normalizedcommunalityvalue:$$

$$\frac{\sum_{n=image_{first}}^{image_{last}} communality_{baseimage_{image_{current}} \wedge baseimage_{image_n}}}{\sum images}$$

The formula calculates the sum of all communality values between different base images, summed over all images, depending on those base images running on a specific host, and divides this value by the sum of all images running on that host. The resulting normalized communality value, which will be referred to as the above mentioned deployment factor, defines the best host from a cache merging point of view and can be used in further algorithms to find the best host for a deployment. As this value is normalized, its scale is equivalent to the communality value 40: a deployment factor of 0 indicates no communality, while a deployment factor of 1 represents full communality. To show the calculation of this value, the communality matrix of table T1 may be used as an example. In table T3 an example of a matrix for host utilization is shown. For each host the amount of images and the base images used by each image running on a host is to be seen. So for host 1 it can be seen that 4 images are running on that host, two using base image 1, one using base image 2, one using base image 3. As example in table T3 the normalized value, i.e. the deployment factor, for each host for base image 1 is calculated. In the example shown a highest deployment factor of 0.7925 results for host 1. In this example, host 1 would be the best for a deployment of a new VM based on base image 1 from a cache merging perspective.

Independently it is possible in another embodiment of the invention that the deployment factor is derived from a pre-defined communality matrix T1, where one or more communality values 40 between all existing base images 26a-26c on all running hosts 100a-100g and the additional image are defined. By this way only a priori information about the behavior of the cloud environment 110 and the deployment of images in the cloud environment 110 may be used and thus the calculation effort in the running system for deployment of images may be reduced.

Figure 5:
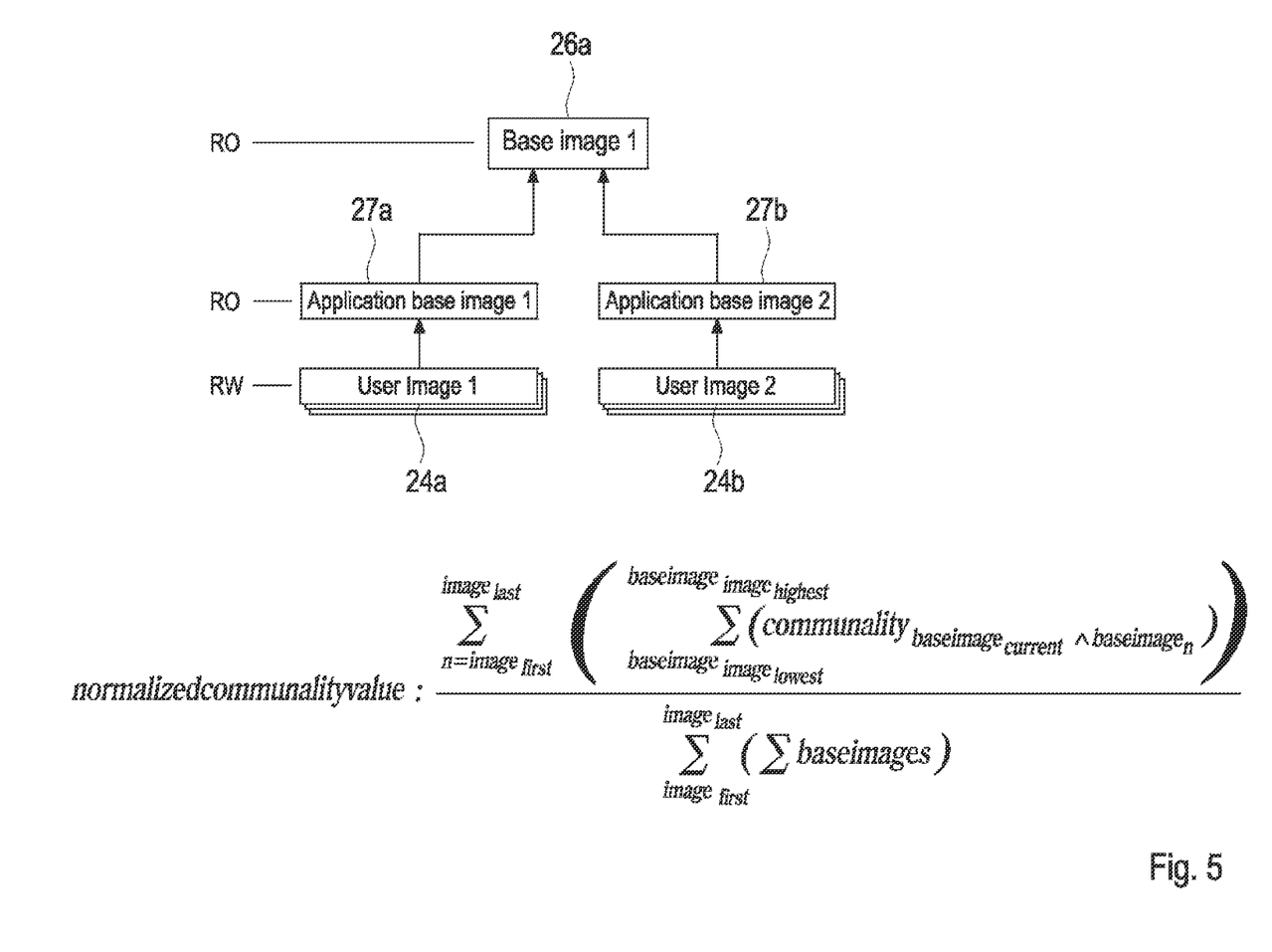
FIG. 5 depicts an example of calculating normalized communality values for cloud environments with multiple image layers.

FIG. 5 shows an example of calculating deployment factors for cloud environments with multiple image layers. In this case the calculation of a normalized communality value is done using every base image 26a, and application base images 27a and 27b of all possible base image layers used by the corresponding user images 24a and 24b. Additionally the resulting communality value is divided by the complete number of base images on that host. For calculation of the deployment factor according to the mentioned algorithm the following formula may be used (also depicted in the Figure).

$$normalized\, communality\, value : \frac{\sum_{n=image_{first}}^{image_{last}} \left( \sum_{baseimage_{image_{n_{lowest}}}}^{baseimage_{image_{n_{highest}}}} (communality_{baseimage_{current} \wedge baseimage_n}) \right)}{\sum_{image_{first}}^{image_{last}} (\sum baseimages)}$$

In addition to the calculation of FIG. 4, the summing of the communality values covers first a sum over all possible base image layers, a specific image is depending on, and then the summing covers all images. In the same way for normalizing the values the summing covers first all base images and then all derived images. Thus the normalized communality value results in a deployment factor for a cloud environment scenario with different base image layers.

Figure 6:
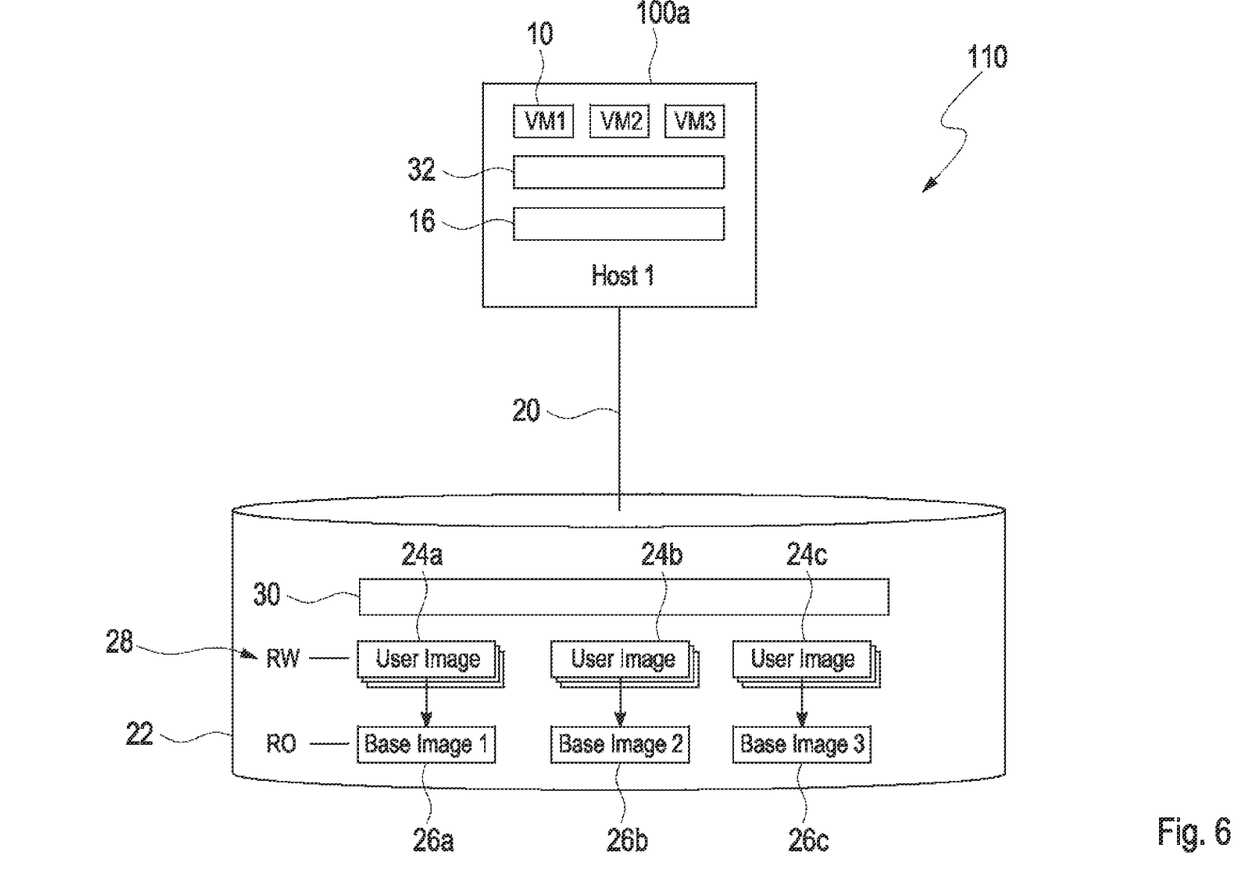
FIG. 6 depicts an example embodiment of a cloud environment according to the invention, displaying a masking cache layer between virtual machines and a file system of the disk, a file system cache, respectively, and a virtual machine manager.

In FIG. 6 an example embodiment of a cloud environment 110 according to favourable embodiment of the invention is shown, displaying a masking cache layer 32 between virtual machines 10 and a file system 28 of the disk 22, a file system cache 30, respectively, and a virtual machine manager 16. The masking cache layer 32 may be represented on the cloud environment 110 as one of a separate file system cache layer, a memory layer, a subdirectory of the file system 28.

The cloud environment 110 includes at least one host 100a-100g coupled to at least one disk 22, one or more virtual machines 10, one or more images 24a-24c of the one or more virtual machines 10 created in a file system 28 of the disk 22 and a virtual machine manager 16 for assigning hardware resources of the computer server system 110 to the one or more virtual machines 10. A masking cache layer 32 between the one or more virtual machines 10 and the virtual machine manager 16 is provided, the masking cache layer 32 including at least one separate entry for every cacheable data block 58 of said file system 28 to be referenced. Profiling information related to one or more of the cacheable data blocks 58 is collected and stored in the masking cache layer 32. The masking cache layer 32 may be configured according to the profiling information, or a configuration is provided for the masking cache layer 32.

The above mentioned masking cache layer 32 implemented between the virtual machines 10 over the file system 28, the file system cache 30 of the disk 22 and the virtual machine manager 16, is shown for a cloud environment 110 similar to FIG. 1 for an example with one host 100a only. The masking cache layer 32 may be implemented as a memory file system, which is configured to represent a file system or a subdirectory over the file system layer 28 and its related file system cache layer 30. In this example embodiment, the masking cache layer 32 has the dedicated purpose to act as a customizable cache layer, the function of which is described hereafter.

The masking cache layer 32 represents a basic tool for the invention described in this application because it offers the possibility to profile cacheable data blocks access of different images and to compare them for similarity. Further it is a quite convenient tool for a very efficient caching technique and finally it delivers basic information for building the communality maps to consolidate images for deployment. The invention described herein is based to a great extent on the exploitation of this additional masking caching technique.

This additional masking cache layer 32 may be configured according to a predefined rule set, the rule set comprising at least one rule, if information from heuristics is used. Such a method is a relatively convenient way of deriving the decision for a cacheable data block 58 to be cached or not.

A more flexible way is to use profiling information according to a rule set derived and adapted to the present situation of deploying images during creation of virtual machines 10 and configuring the masking cache layer according to this dynamically generated information.

For every block 58 of the file system 28 which is referenced, a separate entry in the customizable masking cache layer 32 exists. It stores at least the following information: (a) Profiling information (e.g. a counter): Various information can be stored to profile access patterns to a certain cacheable data block 58 which can be used later on for optimizing the caching behavior; (b) Keep: an indicator specifying whether or not a cacheable data block should be kept in memory after first access; (c) The cached data block 58.

Preferably profiling information about access patterns of the one or more cacheable data blocks 58 of the file system 28 to be referenced may be provided for the rule set. For profiling data block access rates advantageously a counter may be used for counting single cacheable data block accesses and providing this information to a separate rule of the rule set. The method of gathering such profiling information in different ways is described hereafter.

Without any configuration, the masking cache layer 32 (in the function as a cache layer) passes every incoming read or write request to the underlying layer as no information is available which cacheable data blocks to keep in memory.

This is the default behavior. To exploit the functionality of this masking cache layer, a configuration has to be loaded.

Information of the counter for profiling data block access rates may serve for deriving the rule set for the data block access behavior and hence for the decision whether a cacheable data block 58 may be kept or not in the masking cache layer 32. A rule set can either specify which cacheable data blocks to store in memory or which information based on the file type to keep in memory. For disk images a rule set can specify which files are to be kept.

In a further embodiment information about the content of the one or more cacheable data blocks 58, i.e. the information which is stored in the cacheable data blocks 58, may be used for profiling data block access rates. Thus similarity of cacheable data blocks may be advantageously used for decreasing the amount of cached data blocks.

An extension to profiling is to make it file-type aware as well. Depending on the plug-in providing the interpreter for a specific file-type, the information collected and dumped may differ. For disk image files, a file-type awareness would allow to exactly record which file within a certain partition is accessed. Profiling information can be used to create configuration files and to decide whether a cacheable data block 58 may be cached or not.

All the information about a data block access rate may be used for deciding if a cacheable data block 58 is to be loaded in the host system 18 and kept in memory.

In the same way, according to another aspect of the invention, the information about a file type of a data file to be referenced may be used, as one possible realization of a rule in the rule set, for deciding if a cacheable data block 58 is loaded in the host system 18 and kept in the masking cache layer 32.

Image deployment in a cloud environment may further benefit from an example embodiment of the inventive method based on the additional masking cache layer, that may use the possibility of specifying a rule set using path information of the image file system; thus the masking cache layer parses each request and stores the content in cache if the request matches a specified pattern. One example would be to specify a rule forcing every file access request to directory/usr to be cached results in faster access to these files, thereby reducing startup times significantly for these programs.

By using the inventive method to keep cacheable data blocks 58 in a masking cache layer in a cloud environment and making the VM deployment mechanism aware of this, the benefit provided by this method can be exploited in a more intensive way than before. The combination of both features optimizes the I/O performance of cloud environments.

By calculating a normalized deployment factor which shows on which host the overall data block keeping capability is the best for a new deployment, a consolidation of similar or equal images is achieved. Thus, the cacheable data block keeping is maximized, allowing to keep more cacheable data blocks 58 per single image and thereby increase the performance of each image running in the cloud environment.

In different embodiments of the inventive method the cacheable data block 58 represents at least one of a file system image, a database, a picture as the inventive method may be applied for different application, with different user profiles in different cloud environments 110. So the data contents of the deployed images are adapted due to the different application profiles.

Further, a data processing program for execution in a data processing system 110 is proposed, comprising software code portions for performing the method for image deployment in a cloud environment 110 comprising at least two hosts 100*a* . . . 100*g*, particularly for the selection of hosts for the image deployment during creation of new virtual machines 10 when the program is run on a computer 100*a* . . . 100*g*.

According to another aspect of the invention, a computer program product stored on a computer usable medium is proposed, which comprises computer readable program means for causing a computer to perform the following steps when the program is run on a cloud environment 110. Particularly the steps comprise selecting a host 100*a*-100*g* for deploying an additional image according to a deployment factor, representing a communality relationship between one or more existing base images 26*a*-26*c* in the cloud environment 110 and the additional image.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of networks adapters.

The data processing system comprises software code portions for performing said method for image deployment in a cloud environment 110 comprising at least two hosts 100*a*-100*g* coupled to at least one disk 22 and at least one virtual machine 10 created by deploying images 24*a*-24*c* to the disk 22. A host 100*a*-100*g* for deploying an additional image is selected according to a deployment factor, representing a communality relationship between one or more existing base images 26*a*-26*c* in the cloud environment 110 and the additional image, when said program is run on said host systems 100*a* . . . 100*g*.

The invention claimed is:

1. A computer program product comprising a non-transitory computer readable storage medium having a computer readable program stored thereon, wherein the computer readable program, when executed on a computer, causes the computer to:
 select at least one host from at least two hosts coupled to at least one disk for deploying an additional image according to a deployment factor representing a communality relationship between one or more existing base images in a cloud environment and the additional image, wherein the deployment factor is weighted based on access rates to common data blocks of the one or more existing base images that are normalized based on access rates to all of the data blocks of the one or more existing base images; and
 create at least one virtual machine in the selected at least one host by deploying the additional image to the at least one disk.

2. A data processing system, comprising:
 a processor; and
 a memory coupled to the processor, wherein the memory comprises instructions which, when executed by the processor, cause the processor to:
 select at least one host from at least two hosts coupled to at least one disk for deploying an additional image according to a deployment factor representing a communality relationship between one or more existing base images in a cloud environment and the additional image, wherein the deployment factor is weighted based on access rates to common data blocks of the one or more existing base images that are normalized based on access rates to all of the data blocks of the one or more existing base images; and
 create at least one virtual machine in the selected at least one host by deploying the additional image to the at least one disk.

3. The computer program product according to claim 1, wherein the deployment factor is derived from a predefined communality matrix, where one or more communality values between all existing base images of the one or more existing images on all running hosts of the two or more hosts and the additional image are defined.

4. The computer program product according to claim 1, wherein the deployment factor is derived from a generated communality matrix, where one or more communality values between all existing base images of the one or more existing images on all running hosts of the two or more hosts and the additional image are defined.

5. The computer program product according to claim 1, wherein the deployment factor is derived from information of all of the one or more base images and virtual machine application base images being used for image deployment.

6. The data processing system according to claim 2, wherein the deployment factor is derived from a predefined communality matrix, where one or more communality values between all existing base images of the one or more existing images on all running hosts of the two or more hosts and the additional image are defined.

7. The data processing system according to claim 2, wherein the deployment factor is derived from a generated communality matrix, where one or more communality values between all existing base images of the one or more existing images on all running hosts of the two or more hosts and the additional image are defined.

8. The data processing system according to claim 2, wherein the deployment factor is derived from information of all of the one or more base images and virtual machine application base images being used for image deployment.

9. The computer program product according to claim 4, wherein the one or more communality values of the generated communality matrix are calculated for each combination of base image pairs between the one or more existing base images in the cloud environment and the additional image.

10. The computer program product according to claim 4, wherein the one or more communality values are derived from information about content of cacheable data blocks of the one or more existing base images to be kept in memory.

11. The computer program product according to claim 10, characterized in that the one or more communality values are weighted with profiling information of the cacheable data blocks of the one or more existing base images.

12. The computer program product according to claim 11, characterized in that the weighting information is derived from data block access rates.

13. The computer program product according to claim 10, wherein the computer readable program further causes the computer to:
 provide a masking cache layer between the at least one virtual machine and a virtual machine manager, wherein the making cache layer includes at least one separate entry for every cacheable data block of a file system to be referenced;
 collect profiling information related to one or more of the cacheable data blocks;
 store the profiling information in the masking cache layer; and
 configure the masking cache layer according to the profiling information.

14. The computer program product according to claim 13, wherein:
 the masking cache layer may be implemented as a memory file system that is configured to represent a file system or a subdirectory of the file system,
 the configuration is generated by deriving the at least one rule out of the profiling information including at least one of the following:
 providing information about access patterns of the one or more cacheable data blocks of the file system to be referenced;
 providing a counter for profiling data block access rates;
 deriving information about the content of the one or more cacheable data blocks for profiling the data block access rates;
 deriving information about a file type of a file to be referenced in the file system; or
 using path information available for the one or more cacheable data blocks according to the file type the one or more cacheable data blocks are belonging to; and
 the cacheable data block represents at least one of a file system image, a database, or a picture.

15. The data processing system according to claim 7, wherein the one or more communality values of the generated communality matrix are calculated for each combination of base image pairs between the one or more existing base images in the cloud environment and the additional image.

16. The data processing system according to claim 7, wherein the one or more communality values are derived from information about content of cacheable data blocks of the one or more existing base images to be kept in memory.

17. The data processing system according to claim 16, characterized in that the one or more communality values are weighted with profiling information of the cacheable data blocks of the one or more existing base images.

18. The data processing system according to claim 17, characterized in that the weighting information is derived from data block access rates.

19. The data processing system according to claim 16, wherein the instructions further cause the processor to:
 provide a masking cache layer between the at least one virtual machine and a virtual machine manager, wherein the masking cache layer includes at least one separate entry for every cacheable data block of a file system to be referenced;
 collect profiling information related to one or more of the cacheable data blocks;
 store the profiling information in the masking cache layer; and
 configure the masking cache layer according to the profiling information.

20. The data processing system according to claim 19, wherein:
 the masking cache layer may be implemented as a memory file system that is configured to represent a file system or a subdirectory of the file system,
 the configuration is generated by deriving the at least one rule out of the profiling information including at least one of the following:
  providing information about access patterns of the one or more cacheable data blocks of the file system to be referenced;
  providing a counter for profiling data block access rates;
  deriving information about the content of the one or more cacheable data blocks for profiling the data block access rates;
  deriving information about a file type of a file to be referenced in the file system; or
  using path information available for the one or more cacheable data blocks according to the file type the one or more cacheable data blocks are belonging to; and
 the cacheable data block represents at least one of a file system image, a database, or a picture.

* * * * *